United States Patent [19]
Sanborn

[11] Patent Number: 5,925,693
[45] Date of Patent: Jul. 20, 1999

[54] AQUEOUS CORRECTION FLUIDS

[75] Inventor: Norman G. Sanborn, S. Weymouth, Mass.

[73] Assignee: The Gillette Company, Boston, Mass.

[21] Appl. No.: 09/009,208

[22] Filed: Jan. 20, 1998

Related U.S. Application Data

[63] Continuation of application No. 08/735,196, Oct. 21, 1996, which is a continuation of application No. 08/273,093, Jul. 8, 1994, abandoned.

[51] Int. Cl.⁶ .................................................. C09D 10/00
[52] U.S. Cl. ..................... 523/161; 524/430; 524/445; 524/556; 260/DIG. 38; 106/31.23; 106/31.6; 106/31.64
[58] Field of Search ............................ 523/161; 524/430, 524/445, 556; 260/DIG. 38; 106/31.23, 31.6, 31.64

[56] References Cited

U.S. PATENT DOCUMENTS

| | | | |
|---|---|---|---|
| 2,084,918 | 6/1937 | Nelson | 106/445 |
| 3,356,627 | 12/1967 | Scott | 524/516 |
| 3,637,565 | 1/1972 | Sheetz | 524/816 |
| 3,674,729 | 7/1972 | Mirick | 524/556 |
| 3,769,255 | 10/1973 | Sheehan et al. | 523/216 |
| 3,847,857 | 11/1974 | Haag et al. | 524/530 |
| 3,875,105 | 4/1975 | Daugherty et al. | 523/161 |
| 3,926,890 | 12/1975 | Huang et al. | 524/551 |
| 3,985,663 | 10/1976 | Lu et al. | 430/115 |
| 3,997,498 | 12/1976 | Reese et al. | 523/161 |
| 4,043,820 | 8/1977 | Landan | 106/21 A |
| 4,165,988 | 8/1979 | Page et al. | 106/23 B |
| 4,228,028 | 10/1980 | Lin | 252/182.12 |
| 4,248,754 | 2/1981 | Fox et al. | 524/377 |
| 4,290,072 | 9/1981 | Mansukhani | 347/101 |
| 4,308,186 | 12/1981 | Schreurs et al. | 524/389 |
| 4,352,901 | 10/1982 | Maxwell et al. | 524/38 |
| 4,399,254 | 8/1983 | Das et al. | 524/745 |
| 4,507,422 | 3/1985 | Farrar et al. | 524/425 |
| 4,554,307 | 11/1985 | Farrar et al. | 524/425 |
| 4,654,081 | 3/1987 | Dalzell | 524/145 |
| 4,655,834 | 4/1987 | Haruta et al. | 106/206 |
| 4,695,528 | 9/1987 | Dabisch et al. | 430/290 |
| 4,732,614 | 3/1988 | Brooks et al. | 106/21 A |
| 4,740,549 | 4/1988 | Okuzono et al. | 524/379 |
| 4,960,828 | 10/1990 | Higuchi et al. | 525/162 |
| 5,256,191 | 10/1993 | Thompson et al. | 106/19 A |
| 5,332,599 | 7/1994 | Sanborn | 427/259 |
| 5,338,775 | 8/1994 | Matz et al. | 523/161 |

FOREIGN PATENT DOCUMENTS

| | | |
|---|---|---|
| 4036625 | 4/1982 | Germany . |
| 254586 | 3/1988 | Germany . |
| 3919588 | 12/1989 | Germany . |
| 58-49761 | 3/1983 | Japan . |
| 58-162674 | 9/1983 | Japan . |
| 59-131675 | 7/1984 | Japan . |
| 60-68996 | 4/1985 | Japan . |
| 60-250990 | 12/1985 | Japan . |
| 61-174274 | 8/1986 | Japan . |
| 2-97574 | 9/1988 | Japan . |
| 1254962 | 10/1989 | Japan . |
| 1261473 | 10/1989 | Japan . |
| 01292074 | 11/1989 | Japan . |
| 297568 | 4/1990 | Japan . |
| 297570 | 4/1990 | Japan . |
| 02129274 | 5/1990 | Japan . |
| 02169678 | 6/1990 | Japan . |
| 2173167 | 7/1990 | Japan . |
| 02202561 | 8/1990 | Japan . |
| 02209973 | 8/1990 | Japan . |
| 2202561 | 8/1990 | Japan . |
| 02263876 | 10/1990 | Japan . |
| 03031375 | 2/1991 | Japan . |
| 5-5071 | 1/1993 | Japan . |
| 891730 | 12/1981 | U.S.S.R. . |
| WO 92/07039 | 4/1992 | WIPO . |

OTHER PUBLICATIONS

Research Disclosure, Abstract 18182, "Correction Fluid for Dye–Based Ink Print," May, 1979.

Alince, "Performance of cationic Latex as a wet–end additive," *Tappi* vol. 60 12:133–136 (Dec. 1977).

*Primary Examiner*—Marion McCamish
*Assistant Examiner*—John J. Guarriello
*Attorney, Agent, or Firm*—Fish & Richardson P.C.

[57] ABSTRACT

Correction fluids are provided which include a cationic stain blocking agent, an opacifying pigment and water. Preferred opacifying pigments include an alumina treated titanium dioxide and a clay. The new correction fluids have improved bleed resistance and hiding power.

10 Claims, 1 Drawing Sheet

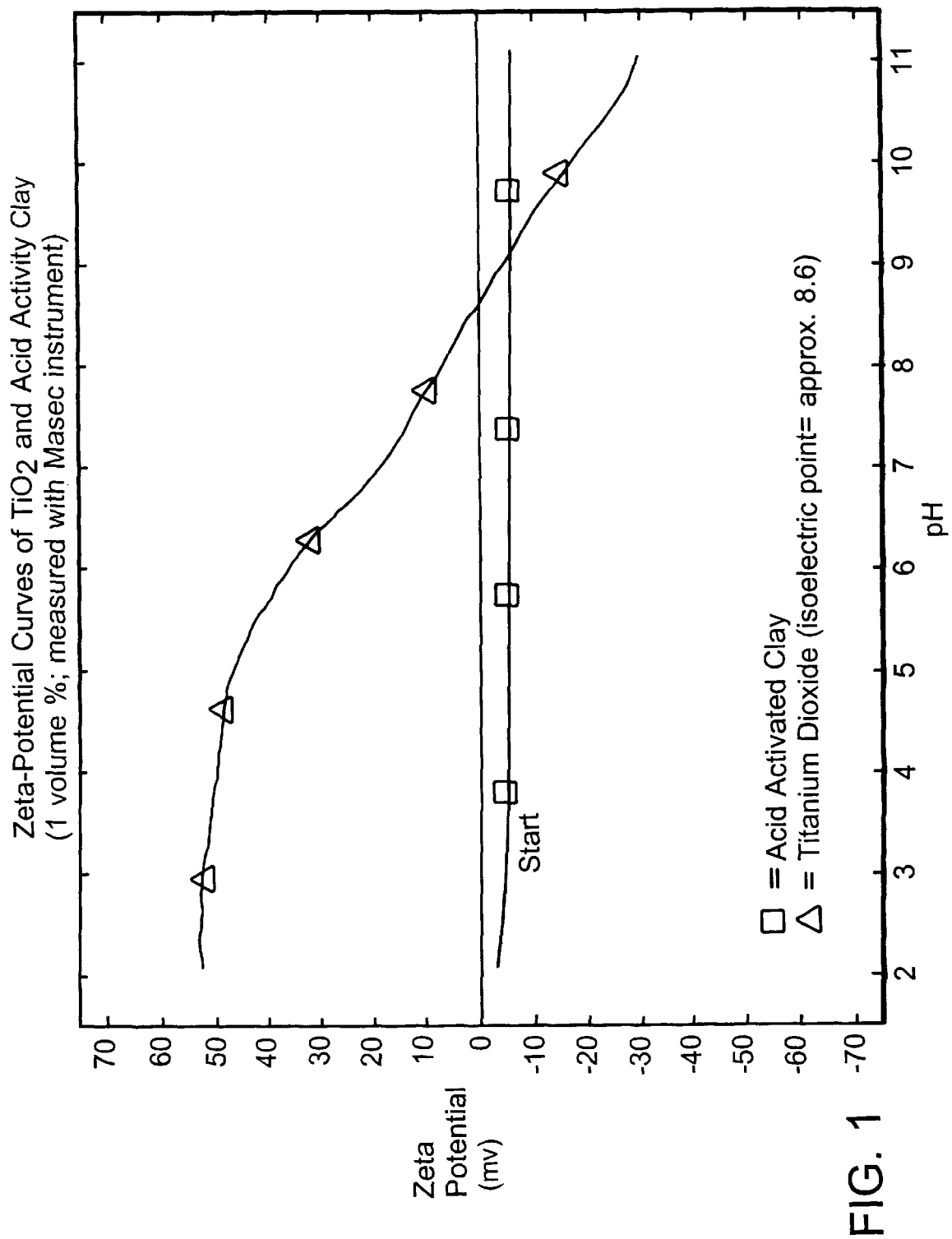

AQUEOUS CORRECTION FLUIDS

This is a continuation of U.S. application Ser. No. 08/735,196, filed Oct. 21, 1996, (pending), which is a FWC of U.S. application Ser. No. 08/273,093, filed Jul. 8, 1994, now abandoned.

BACKGROUND OF THE INVENTION

The invention relates to aqueous correction fluids.

Correction fluids are used for obscuring handwritten, typewritten, photocopied, or laser printed markings on paper. Generally, a correction fluid is applied, in liquid form, to a marking on a paper surface, and then allowed to dry to form a film which effectively covers the underlying marking and is capable of receiving a corrective marking.

Water-based correction fluids typically include a pigment, e.g., titanium dioxide, and a latex binder which is usually an aqueous polymer emulsion, e.g., an acrylic copolymer or ethylene vinyl acetate (EVA) emulsion. While water-based fluids are better for the environment than solvent based systems, the water and/or any organic solvents formulated into aqueous based correction fluids have a tendency to dissolve or solubilize the dyes present in the underlying marking, causing "bleeding" or "smudging" of the underlying ink marking into the liquid correction fluid, which results in a discoloration of the dried film. The latex binder can, in some formulations, reduce the dissolution of underlying markings to which the fluid is applied, but they often do not prevent the problem of bleeding or smudging entirely. "Non-water-fast" inks, e.g., porous or rollerball pen inks, are especially difficult to cover with aqueous correction fluids without bleeding of the marking into the correction fluid.

SUMMARY OF THE INVENTION

The correction fluids of the invention have improved bleed resistance, particularly when used to correct non-water-fast inks, and have excellent hiding power, allowing the correction fluid to completely obscure most or all markings.

The improved correction fluids avoid the problem of bleeding by including a cationic stain blocking agent. The correction fluids also include an opacifying agent which is formulated to provide excellent hiding power. Preferably, the opacifying agent includes a blend of a titanium dioxide and a clay which have particular physical properties and which are provided in a specific ratio, so that the blend acts in combination with the selected stain blocking agent to provide the correction fluid with good hiding power.

In one aspect, the invention features a correction fluid which includes, as a cationic stain blocking agent, ABCO Experimental Size E-700; water; and an opacifying agent. Preferably, the opacifying agent includes a blend of a titanium dioxide that is amphoteric over a pH range of 2–12 with an acid activated clay. More preferably, the acid activated clay is anionic over a pH range of 2–12 and has a Zeta-potential that is substantially constant over a pH range of 2–12, and the titanium dioxide has an isoelectric point (Zeta-potential=0) at a pH between 7 and 9. The titanium dioxide and clay are preferably provided in a ratio of from about 0.5:1 to 0.9:1, more preferably 0.6:1 to 0.8:1. Preferably, the correction fluid includes between 41 and 56%, and more preferably between 45 and 53%, of the opacifying pigment by weight. Preferably, the correction fluid thus includes between 25 and 33%, and more preferably between 27 and 31% of a rutile $TiO_2$ by weight, and between 16 and 23%, and more preferably between 18 and 21%, of an acid activated clay by weight. The preferred fluid further includes at least 40%, more preferably between 41 and 53% of the stain blocking agent by weight, and between 0 and 10%, more preferably between 0 and 9% water by weight, based on the total weight of the correction fluid.

In another aspect, the invention features a correction fluid which includes, as a cationic stain blocking agent, a polymer selected from WORLEECRYL 7712, WORLEECRYL 7712E and WORLEECRYL 7712W; water; and an opacifying agent that includes a blend of a titanium dioxide that is amphoteric over a pH range of 2–12 with an acid activated clay. Preferably, the clay is anionic over a pH range of 2–12 and has a Zeta-potential that is substantially constant over a pH range of 2–12, and the titanium dioxide has an isoelectric point (Zeta-potential=0) at a pH between 7 and 9. The titanium dioxide and clay are preferably provided in a ratio of from about 0.7:1 to 1.2:1, more preferably 0.8:1 to 1.1:1. Preferably, the correction fluid includes between 42 and 58%, and preferably between 45 and 55%, of the opacifying pigment by weight. Preferably, the correction fluid thus contains between 22 and 30%, and more preferably between 24 and 28% of a rutile $TiO_2$ by weight, and between 20 and 28%, and more preferably between 22 and 26%, of an acid activated clay by weight. The fluid further includes between 21 and 29%, more preferably between 22 and 28% of WORLEECRYL 7712 by weight, and between 22 and 28%, more preferably between 23 and 27% water by weight, based on the total weight of the correction fluid. The correction fluid can further include between 1 and 2% of a wetting agent.

In both aspects, it is preferred that the opacifying pigment include a blend of rutile titanium dioxide and an acid activated clay composition. The titanium dioxide preferably has an average particle diameter of less than 0.8 micrometer and a hydrophilic surface. The hydrophilic surface can result from surface treatment of the titanium dioxide particles with alumina or a combination of alumina and silica. A preferred clay is an acid activated bentonite clay. In some preferred embodiments, the correction fluid further includes a nonionic, cationic and/or amphoteric wetting agent.

The invention also features methods of covering a non-water-fast ink marking on paper by applying to the non-water-fast ink marking on the paper a correction fluid of the invention, and allowing the correction fluid to dry.

In another aspect, the invention features a method of making a correction fluid, including: (a) selecting a suitable quantity of a cationic polymer capable of inhibiting bleed of anionic dyes found in aqueous inks; (b) determining a ratio of an acid activated clay to an alumina and/or silica treated $TiO_2$, so that the ratio, when used in conjunction with said quantity of cationic polymer, will fully obscure, without observable bleed, markings made with a Papermate metal roller ball blue ink pen on notepad paper (TOPS "The Legal Pad" Wide Rule Gum 10 No. 7525, Tops Business Forms, St. Charles, Ill.), when the pen is used to form a line of circles on the paper, and the correction fluid is applied at a uniform wet film thickness of 1.5–2.0 mils over the circles using a drawdown bar, and (c) combining the cationic polymer, the clay and the titanium dioxide with a sufficient quantity of water to provide an aqueous correction fluid. Preferably, the method also includes the step of selecting an acid activated clay that is anionic over a pH range of 2–12 and has a Zeta-potential that is substantially constant over a pH range of 2–12.

As used herein, the term "non-water-fast ink" refers to an ink that contains one or more dyes that are soluble in or resolubilized by the water and/or organic solvents present in an aqueous based correction fluid that is applied to a marking made with the ink.

As used herein, a "stain blocking agent" is a cationic polymer that has the ability to bind anionic dye and prevent the dye from moving through the correction fluid, and unacceptably discoloring the dried corrective film.

As used herein, the term "Zeta-potential" refers to the potential difference produced at a solid-liquid interface due to ions absorbed from the moving solution. Zeta-potential is generally measured by electrophoresis.

Other features and advantages of the invention will be apparent from the Description of the Preferred Embodiments thereof, and from the claims.

BRIEF DESCRIPTION OF THE DRAWINGS

FIG. 1 is a graph showing the Zeta-potential over pH range 2–11 of an acid activated clay and a titanium dioxide that are suitable for use in a correction fluid of the invention.

DESCRIPTION OF THE PREFERRED EMBODIMENTS

The preferred correction fluids include a cationic stain blocking agent; water; an opacifying pigment containing a blend of a titanium dioxide which includes at least 94% $TiO_2$ that is surface treated with alumina or a combination of alumina and silica and a clay that is anionic over a pH range of 2–12 and has a Zeta-potential that is substantially constant over the same range; black, brown, red, and yellow pigments as colorants to color match different shades of white paper; and a defoaming agent. These correction fluids have a pH of between 3 and 9, and preferably between 4 and 6.

One preferred stain blocking agent is Worleecryl 7712 (Worleecryl-Chemie GmbH, Germany). This particular stain blocking agent contains about 40% acrylic polymer, about 20% isopropanol and about 40% water, and has a pH of approximately 5.0. The acrylic polymer is a poly(amino alkyl methacrylate) which comprises a terpolymer of ethyl acrylate, methyl methacrylate and dimethyl amino ethyl methacrylate (EA/MMA/DMAEMA terpolymer), containing approximately 34% of EA, 37% of MMA, and 19% of DMAEMA by weight, respectively. DMAEMA is an amine functional acrylic monomer, which, when in the terpolymer is neutralized to a pH of about 5.0, is protonated and carries a positive charge (i.e., is quaternized). Worleecryl 7712W and 7712E polymers are also suitable. These polymers contain the same relative proportions of EA, MMA and DMAEMA as Worleecryl 7712, but vary in volatile content and molecular weight. Worleecryl 7712W contains 25% solids content in water, while 7712E contains a 40% solids content in a 1:1 water/ethanol solution. The molecular weights are as follows: 7712 and 7712E: 41,000; 7712W: 57,000. The viscosities at 20° of each solution are as follows: 7712: 3000–5000 mPa-s; 7712W: 300–800 mPa-s; 7712E: 5000–7000 mPa-s. Worleecryl 7712, 7712W and 7712E all have pH values of approximately 5.

Another preferred stain blocking agent is ABCO E-700 (ABCO Industries, Inc., Roebuck, S.C.). This stain blocking agent comprises an aqueous poly(amino alkyl methacrylate) hydrosol, i.e., a colloidal suspension of an acrylic copolymer in water containing 20–30% (on monomer weight) of an amine functional monomer. The amine functional monomer of the copolymer is post-neutralized with acetic acid to render the polymer more water-soluble. The hydrosol has a solids content of from 15–25% by weight, and a pH of from about 4.5 to 5.5. The hydrosol has a viscosity of less than 300 cps RVT. The polymer has a Tg of less than about 25° C.

The relative proportions of the stain blocking agent, titanium dioxide, clay and water will differ, depending upon whether the selected stain blocking agent is a WORLEE-CRYL polymer or the E-700 polymer.

Enough of the stain blocking agent must be used to achieve the desired non-bleed properties of the correction fluid. In effect, this cationic polymer interacts and binds with the anions from the ball-point pen ink that cause the bleeding before they have a chance to bleed through the corrective coating. Preferably, the correction fluid should include at least 40%, and more preferably 41 to 53%, of the E-700 polymer, or about 21 to 29%, more preferably 22 to 28%, of the WORLEECRYL 7712 polymer, by weight of the total composition. Too little of the stain blocking agent will not effectively prevent bleed, while too much may cause a significant increase in viscosity and loss of coverage.

The stain blocking agent primary serves as a binder, enabling the correction fluid to effectively bind pigments to paper and form a continuous dry film at room temperature. The dried film should be receptive to correcting marks without cracking and flaking off the paper.

A sufficient amount of water should be used to make the fluid thin enough to be easily applied to paper, e.g., by a brush. Adjustments are made by first measuring the viscosity of the composition at a relatively low water level, and then adding incremental amounts of water until the desired viscosity is obtained. It is preferred that sufficient water be added to provide a viscosity from about 300 to 1000 cps as measured on a Brookfield Viscometer. Too much water would undesirably increase the drying time of the fluid. Preferably, when the E-700 polymer is selected, the correction fluid should include 0.0 to 10%, and more preferably 0.0 to 9%, water by weight of the total composition; when a WORLEECRYL polymer is selected, the correction fluid should include about 22 to 28%, more preferably 23 to 27% water by weight of the total composition.

Preferred grades of titanium dioxide have a small average particle size, preferably less than 0.8 micrometer, to increase dispersibility, and are treated with alumina or a combination of alumina and silica to provide the pigment with a hydrophilic surface. Suitable titanium dioxide pigments include commercially available rutile titanium dioxides and anatase titanium dioxides, or blends or mixtures of these which preferably have an average particle size between approximately 0.2 to 0.4 microns and an average oil absorption of about 16 g/100 g pigment.

The preferred titanium dioxide is Ti-Pure® R-900 (DuPont, Wilmington, Del.), which is a rutile titanium dioxide composition manufactured by the chloride process. This composition includes a minimum of about 94% $TiO_2$, and 4.5% alumina. The particle size varies, but 80% of the particles are 0.4 microns or smaller, and 90% of the particles are under 0.6 microns. The pH of Ti-Pure® R-900 in an aqueous suspension is about 8.2.

Other suitable titanium dioxide compositions include Tioxide (Tioxide America, Inc., Columbia, Md.) and Kronos (Kronos, Inc., Houston, Tex.). Preferably, when the E-700 polymer is used, the correction fluid will preferably include from about 25 to 33%, and more preferably 27 to 31%, of the titanium dioxide by weight of the total composition; when a WORLEECRYL polymer is selected, the correction fluid will preferably include from about between 22 and 30%, and more preferably between 24 and 28% of the rutile $TiO_2$ by weight. Suitable titanium dioxide compositions are amphoteric over a pH range of 2–12, i.e., they have a positive Zeta-potential at a pH of less than about 7, a negative Zeta-potential at a pH of greater than about 9, and an isoelectric point (Zeta-potential=0) between 7–9 pH. (See FIG. 1.)

Suitable clays are acid activated clays. Preferably, the clay is anionic over a pH range of 2–12 and has a Zeta-potential that is substantially constant over a pH range of 2–12 (see FIG. 1). Preferably, the clay is a delaminated clay having a platelet-like morphology. A particularly preferred clay has a mean particle size of about 2.5 microns, an average surface area of about 290 $m^2/g$ (BET/$N_2$ measurement), and a particle thickness of about 10 Angstroms. Suitable clays include bentonite (montmorillonite) clays, such as a chemically modified aluminum silicate based on montmorillonite. A preferred bentonite clay is Copisil Standard Grade color developer (Sud-Chemie AG, Munich, Germany). The clay is added in an amount that enhances the hiding power of the opacifying pigment and the ability to write with ball-point pen ink over the corrected spot. When the E-700 polymer is used, the correction fluid will preferably include 16 to 23%, and more preferably 18 to 21%, of the clay by weight of the total composition; when a WORLEECRYL polymer is used, the correction fluid will preferably include between 20 and 28%, and more preferably between 22 and 26%, of an acid activated clay by weight.

To color match, e.g., a white paper, the titanium dioxide pigment must be tinted with other organic or inorganic pigments, such as burnt umber, using standard color matching techniques. The preferred burnt umber pigment is pigment brown 7. These pigments are ground/dispersed in with the opacifying pigments, and are used in amounts sufficient to color match the shade of white of the paper on which the correction fluid is to be used. Of course, colored correction fluid for colored paper can also be made.

The correction fluids may contain other conventional additives. For example, the correction fluids may include a defoaming agent, e.g., Nopco® 8034 (Henkel Corp., Ambler, Pa.), or any other defoaming agent typically used in correction fluids. Such defoaming agents are usually mineral oil derivatives mixed with amorphous silica, and should be added in an amount sufficient to ensure that the correction fluid is deaerated and does not foam when shaken. Preferably, the correction fluid should include 0.05 to 1.0%, and more preferably 0.05 to 0.15% defoaming agent by weight of the total composition. The correction fluids may also contain one or more cationic, amphoteric, and/or nonionic surfactants to maintain viscosity and shelf-life stability during storage.

The following examples illustrate the invention.

EXAMPLE 1

| Ingredients | Weight Percent |
|---|---|
| WATER | 26.74 |
| WORLEECRYL 7712 | 22.10 |
| COPISIL STANDARD | 24.52 |
| TI-PURE ® R-900 | 26.64 |
| | 100.00 |

EXAMPLE 2

| Ingredients | Weight Percent |
|---|---|
| WATER | 5.68 |
| E-700 | 42.90 |
| COPISIL STANDARD | 20.49 |
| TI-PURE ® R-900 | 30.93 |
| | 100.00 |

The correction fluids containing the ingredients shown in Examples 1 and 2 were prepared by the following procedure:

1. Adding the specified amount of deionized water into a clean mixing tank equipped with a Cowles type (saw tooth) mixing blade.
2. Turning on the mixer and running it at @ 400–600 rpms, adjusting the speed to maintain a vortex without excess splashing.
3. Slowly adding the stain blocking agent (Worleecryl 7712 or E700) into the vortex.
4. Increasing the speed to 700 rpms again, to maintain sufficient vortex without generating excessive foam.
5. Adding half of the defoamer.
6. Turning on the dust collector and slowly adding the specified amount of acid activated clay (Copisil STD), at a rate which allowed complete dispersion of the powder. Speed was adjusted as necessary to maintain a vortex and good dispersion without developing excessive foam.
7. Slowly adding the specified amount of titanium dioxide (Ti-Pure R-900), again allowing it be fully dispersed before more was added.
8. Slowly adding the specified amount of colored pigments into the vortex. Speed was adjusted as necessary to maintain vortex and good dispersion.
9. Turning off the dust collector and mixing for twenty minutes at 700 rpm.
10. Adding the remaining defoamer into the vortex and mixing an additional few minutes.
11. Checking the physical properties of the finished fluid to verify that the fluids met specifications.

The fluids of Examples 1 and 2 were tested on markings made with a Papermate metal roller ball blue ink pen on notepad paper (TOPS "The Legal Pad" Wide Rule Gum 10 No. 7525, Tops Business Forms, St. Charles, Ill.). The pen was used to form a line of circles on the paper, and the correction fluid was applied at a uniform wet film thickness of 1.5–2.0 mils over the circles using a drawdown bar (Bird Bar). The fluids obscured the underlying markings completely, and no bleed or smudging was observed.

The preferred correction fluids can be used in conventional bottle and brush applicators, as well as other known correction fluid applicators.

Other embodiments are within the claims. For example, in addition to the preferred ingredients listed above, the correction fluids can also contain various additives known in the art, as long as they do not interfere with the cationic stain blocking agent, i.e., as long as they are substantially cationic or nonionic.

I claim:

1. An aqueous correction fluid comprising:
    as a cationic stain blocking agent, an aqueous poly(amino alkyl methacrylate) hydrosol containing about 20–30% of an amine functional monomer;
    an opacifying pigment; and
    water.
2. The correction fluid of claim 1 wherein said opacifying pigment includes a clay which is anionic over a pH range of from 2 to 12.
3. The correction fluid of claim 2 wherein said clay has a Zeta-potential that is substantially constant over a pH range of from 2–12.
4. The correction fluid of claim 2, wherein said clay is an acid activated clay.
5. The correction fluid of claim 2, wherein said opacifying pigment includes titanium dioxide that has been alumina and/or silica treated.

6. The correction fluid of claim 5 wherein said clay and said alumina and/or silica treated titanium dioxide are present in a weight ratio of from about 0.5:1 to 0.9:1.

7. The correction fluid of claim 6, wherein said clay and said titanium dioxide are present in a weight ratio of from about 0.6:1 to 0.8:1.

8. The correction fluid of claim 1, wherein said opacifying pigment comprises titanium dioxide.

9. The correction fluid of claim 1, comprising from at least 40 weight percent of said stain blocking agent, from about 41 to 56 weight percent of said opacifying pigment, and from about 0 to 10 weight percent water.

10. The correction fluid of claim 1, further comprising a defoamer.

\* \* \* \* \*